United States Patent [19]

Hirohata et al.

[11] 4,168,891
[45] Sep. 25, 1979

[54] CAMERA FOR DAYLIGHT AND FLASH PHOTOGRAPHY

[75] Inventors: Michio Hirohata, Kawasaki; Mutsuhide Matsuda, Yokohama; Zenzo Nakamura, Urawa, all of Japan

[73] Assignee: Canon Kabushiki Kaisha, Tokyo, Japan

[21] Appl. No.: 797,637

[22] Filed: May 17, 1977

[30] Foreign Application Priority Data

May 20, 1976 [JP] Japan .................................. 51/58277

[51] Int. Cl.² .................... G03B 15/05; G03B 1/00; G03B 17/38
[52] U.S. Cl. .................................. 354/33; 354/60 F; 354/212; 354/268
[58] Field of Search ........................ 354/32–35, 354/126, 145, 212, 27, 57, 60 F, 60 E, 127, 128, 139, 149, 266–268; 242/71, 71.3

[56] References Cited

U.S. PATENT DOCUMENTS

| 3,073,226 | 1/1963 | Greger et al. | 354/32 |
| 3,078,772 | 2/1963 | Goshima | 354/39 |
| 3,367,251 | 2/1968 | Furuta | 354/212 |
| 3,529,524 | 9/1970 | Ueda | 354/32 |
| 3,714,872 | 2/1973 | Mashimo et al. | 354/33 |

OTHER PUBLICATIONS

"Photographic Industries", Apr. 1961, Canon's Canonet Camera.

Primary Examiner—L. T. Hix
Assistant Examiner—William B. Perkey
Attorney, Agent, or Firm—Toren, McGeady and Stanger

[57] ABSTRACT

A camera having an electronic flash unit either incorporated therein or removably attached thereto is provided with a flash mode selector and a flash energy supply control switch both arranged to be rendered operative when the shutter cocking lever is pulled from the retracted position to an initial position effective for shutter cocking operation, and, upon detection of occurrence of a lower light value beyond an automatically operating daylight diaphragm aperture range, to be simultaneously closed in automatic response to an actuation of a shutter release trigger in excess of a normal stroke length. This is done while still preventing the shutter from running. When the voltage on a storage capacitor reaches a trigger level for the flash tube in a time interval measuring from the closure of the switch, a flash exposure diaphragm aperture is automatically formed depending upon the flash exposure value and the voltage of the storage capacitor. When the shutter cocking lever is retracted, the switch is opened to prevent accidental consumption of the electrical energy of the power source.

3 Claims, 2 Drawing Figures

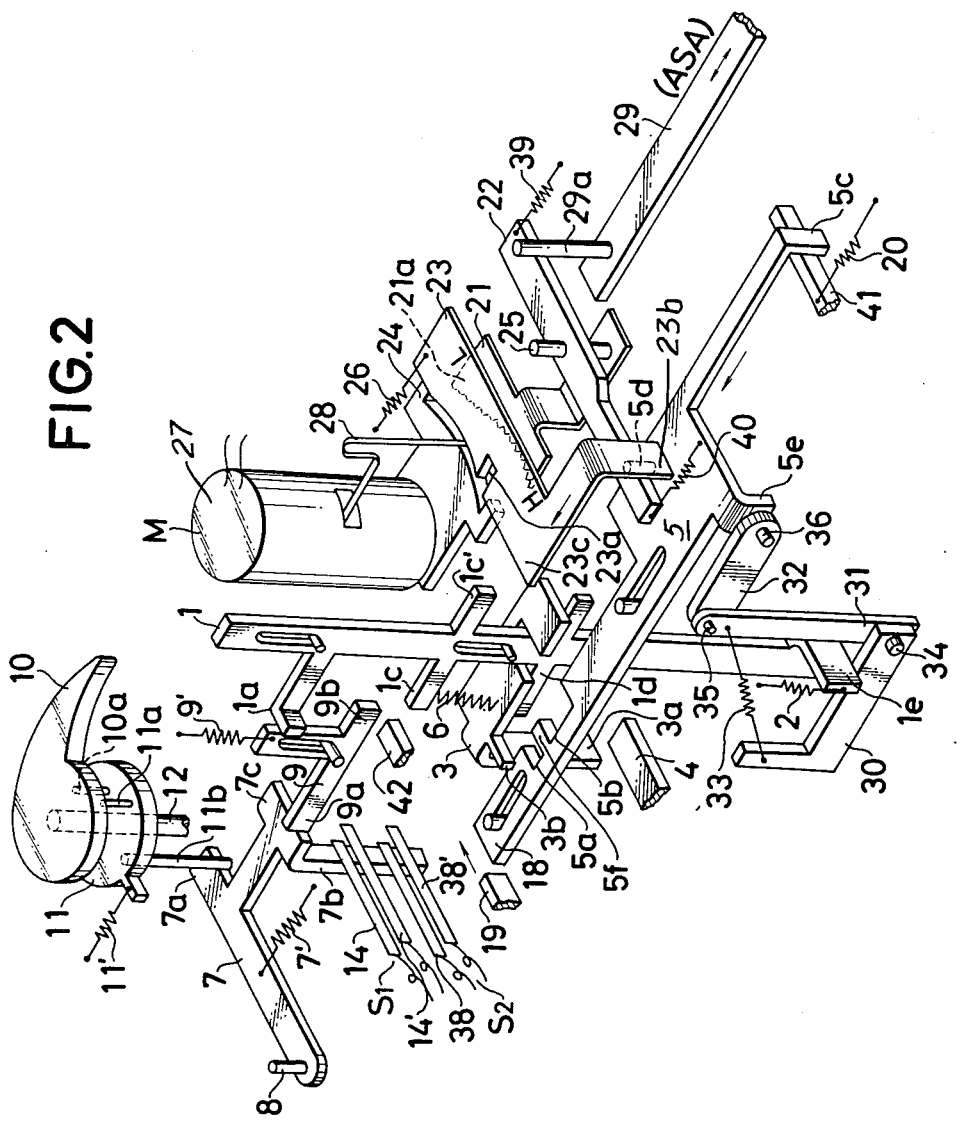

CAMERA FOR DAYLIGHT AND FLASH PHOTOGRAPHY

BACKGROUND OF THE INVENTION

This invention relates to cameras for daylight and flash photography, and, more particularly, to a switch device for selection of the operating range and for flash energy supply control in such camera especially of the type having an electronic flash unit either incorporated therein or removably attached thereto.

It is known to provide a camera for daylight and flash photography with a mode selector operating upon detection of occurrence of a lower light value beyond an automatically operating daylight exposure range to automatically switch the camera to an automatically operating flash exposure range in which the diaphragm aperture is adjusted in accordance with the camera-to-object distance and the guide number value corresponding to the flash tube, such as, for example, disclosed in U.S. Pat. No. 3,073,226.

With this camera equipped with a flash unit of known construction, however, it is impossible to assure firing of the flash unit at a point in time such that a camera release is actuated. This is so because it takes a considerably long time to charge the storage capacitor from zero volts to a satisfactory operating voltage level for the speedlight. It has, therefore, been the prior art practice at first to view the exposure meter of the camera indicating whether or not the light value is in a daylight exposure range, and then, if flash lighting is necessary, to close a flash energy supply control switch manually prior to the actuation of camera release. When the light value is marginally available or unavailable in the daylight exposure range, the manual switching of the camera by seeking the condition of the exposure meter for each actuation of camera release is a very time consuming operation. Further, should a necessary manipulation be overlooked for maintaining of the flash energy supply control switch closed, the storage capacitor will unnecessarily be connected to the battery. As a result, the battery may run down by leakage and the like after a relatively short period of useful operation. This becomes serious particularly when the camera is not used for a long time.

Accordingly, the present invention has for its general object to provide a camera for daylight and flash photography adapted to operate with an electronic flash unit and which overcomes the above-mentioned conventional drawbacks.

In one embodiment of the invention, a mechanism for jointly actuating and jointly releasing a flash mode selector and a flash energy supply control switch mounted in the camera housing comprises actuating means for controlling opening and closing operation of the selector and the switch, first switch blocking means arranged between the actuating means and a shutter release trigger upon actuation of the trigger employing a stroke length greater than normal to be moved out of the path of movement of the actuating means so that the flash mode is selected and the switch is closed, second switch blocking means associated with setting means, the latter being manually operable from the outside of the camera housing, and rendering operative the actuating means, and blocking means responsive to occurrence of a lower light value beyond an automatically operating daylight exposure range for preventing the shutter from being caused to run by a first actuation of the shutter release trigger.

By this mechanism it is made possible after the positive setting of the preparatory means, if flash lighting is necessary, to automatically switch the camera from the daylight to the flash exposure range with simultaneous closure of the flash energy supply control switch in response to a first actuation of the shutter release trigger. Upon a subsequent second actuation of the trigger, a camera release starts to effect automatic formation of the flash exposure diaphragm aperture which is then followed by the running of the shutter. Alternatively, when the light value falls within the automatic daylight exposure range, the first actuation of the shutter release trigger results in the camera release, while the storage capacitor for the flash tube remains disconnected from the electrical power source despite the positive setting of the setting means. Thus, the electrical energy of the power source is not unnecessarily consumed. In addition thereto, when the setting means is set in the retracted position for the purpose of leaving the camera unused, the second switch blocking means is rendered effective so that even when the shutter release trigger is unintentionally depressed, the flash energy supply control switch is not closed. This further minimizes the possibility of unnecessary consumption of the electrical energy of the battery.

The present invention will be best understood from the following description of a specific embodiment when read in connection with the accompanying drawings in which:

FIG. 2 is a perspective view of an example of the mechanism for actuating and releasing the mode selector and the flash energy supply control switch of FIG. 1 associated with a camera releasing, a diaphragm control and a shutter cocking mechanism.

Figure 1:
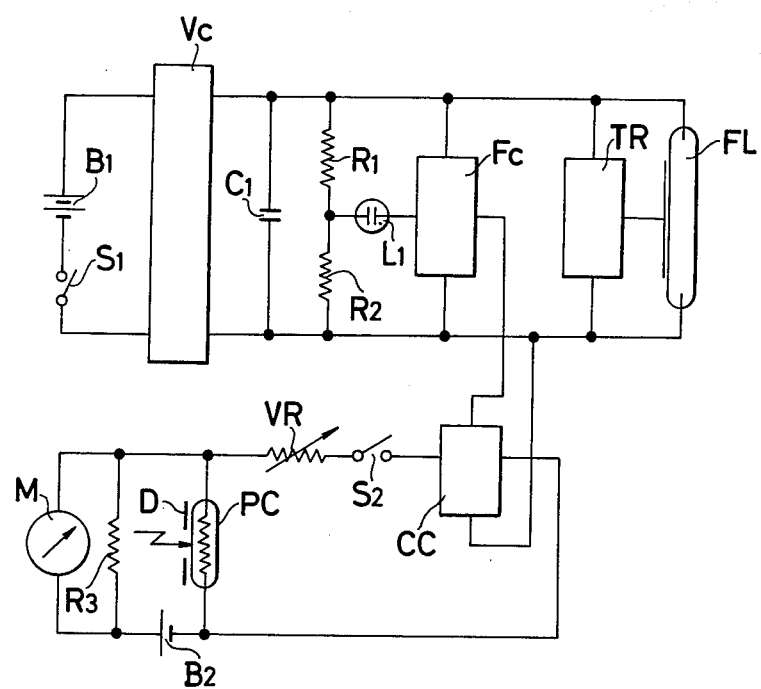
FIG. 1 is a schematic circuit diagram, partly in block form, of an example of an arrangement of a mode selector and a flash energy supply control switch in a light metering circuit of a camera and in a flash lamp circuit of an electronic flash unit respectively.

Referring to FIG. 1, there is shown one embodiment of the circuit according to the present invention comprising an electrical power source or battery $B_1$ of the electronic flash unit, a flash energy supply control switch $S_1$ connected at its fixed contact to the negative terminal of the battery $B_1$, a storage capacitor $C_1$ connected through a DC booster Vc to battery $B_1$, a flash lamp FL connected across capacitor $C_1$, a trigger circuit TR for flash lamp FL, a resistor voltage divider with two resistors $R_1$ and $R_2$ connected in series with each other and across capacitor $C_1$ for detecting the voltage stored on the storage capacitor $C_1$, a neon lamp $L_1$ connected to the output tap of the voltage divider $R_1$, $R_2$ upon attainment of the voltage on the storage capacitor to the satisfactory operating level to be lighted on, and a flash control circuit FC such as that disclosed in U.S. Pat. No. 3,714,872.

The exposure metering circuit comprises an electrical power source or battery $B_2$, a photo-sensitive element Pc such as a CdS cell arranged to receive light coming from an object to be photographed through a diaphragm of which the size of the aperture opening is adjusted in accordance with the preselected shutter speed, an exposure meter M connected in series with the photosensitive element Pc to battery $B_2$ and having a pointer deflected to a position which is scanned to effect the automatic formation of the daylight exposure diaphragm aperture, provided that a flash mode selector switch $S_2$ is open. When switch $S_2$ is closed, a variable resistor VR whose resistance value is varied with the camera-to-object distance, as it is operatively connected with a focusing control ring in the camera lens barrel, and a flash exposure computer CC are brought into electrical connection with the exposure meter M. Thus, a flash exposure diaphragm aperture is automatically formed in relation to the light value, the preselected shutter speed, the camera-to-object distance and the voltage on the storage capacitor $C_1$ as detected by the flash control circuit FC of the firing circuit.

Referring to FIG. 2, a shutter release trigger 1 cooperating with a shutter button not shown is biased by a spring 2 upwardly as viewed in the figure and has a lug 1e acted on a driving lever 30 at one third from a pivot pin 34 thereof. The levers 30 and 31 are rotatably supported about the fixed pin 34 and connected by the spring 33 which is stronger than the spring 20. The follower lever 31 is pivotally connected to a linkage by a pin 35 at one end thereof, the opposite end of which is pivotally connected to a slidable plate 5 by a pin 36 at a downwardly extending lug 5e thereof. The slidable plate 5 is biased by a spring 20 through a diaphragm closing down lever 41-and-a hook 5c connection, the hook 5c downwardly extending from plate 5. Thus, downward pressure on release trigger 1 rotates lever 30 counterclockwise around pin 34 causing spring 33 to pull lever 31 counterclockwise around pin 34, thereby pulling lever 32 and attached plate 5 to the left.

An exposure meter 27 corresponding to meter M of FIG. 1 has a pointer 28 movable along an arcuate edge of a stationary abutment 24. As the slidable plate 5 is moved to the left, a scanning member 21 with steps 21a thereon is impelled against the pointer 28 through lever differential means, and a pressor plate 23 is moved in parallel with the path of movement of the scanning member 21 as guided by means (not shown) under the action of a spring 26 in contact with its downwardly extending lug 23b with a pin 5d extending upwardly from slidable plate 5. The lever differential means comprises a seesaw lever 22 pivotal at a pin 25 mounted on a tail portion of the scanning member 21 and biased by a spring 40 for positive coupling at one end thereof with the pin 5d and by a spring 39 for positive coupling at the opposite end with a pin 29a upwardly extending from a film speed (ASA) setting slide 29. The pressor plate 23 also serves as a latching means for the shutter release trigger 1 when the pointer 28 is deflected to the extreme left position as aligned with a lateral recess 23a formed in a portion of the plate 23.

An actuating mechanism of the invention comprises an switching means 7 pivotal about a pin 8 and biased by a spring 7' in a clockwise direction so that when a first switch blocking means in the form of a vertically movable slide 9 is taken out of the path of movement of a head 7c of the switching means 7, two switches 14 and 38 corresponding respectively to the flash energy supply control switch $S_1$ and selector switch $S_2$ of FIG. 1 are simultaneously closed. A second blocking means in the form of a pin 11b extends downwardly from a setting means 11 rotatable about a shaft 12 carrying at the top end a film winding lever 10 into the path of movement of a projection 7a of the switching means 7 at a point such that when the film winding lever 10 is in the retracted position where a pin 11a upwardly extending from the setting means 11 is in contact with a stopper 10a downwardly extending from the film winding lever 10, the switches 14 and 38 are not caused to be closed by the removal of the first switch blocking means 9 from the actuating lever head 7c, and a blocking means in the form of an extension 5f between two lateral recesses 5a and 5b of the slidable plate 5 at a location such that when the right terminal position at the deflected pointer 28 indicating a lower light value beyond the automatically operating daylight exposure diaphragm aperture range is scanned by the scanning member 21, the extension 5f is placed in alignment with the projection 3b of the shutter release member 3 to thereby prevent the actuation of the shutter release trigger 1 from resulting in actuation of the shutter, while permitting the same actuation of the trigger 1 upon further downward movement in excess of a normal stroke length to result in disengagement of the first switch blocking means at an extension 9a from the switching lever head 7c as the opposite extension 9b is struck by an arm 1a rectangularly extending to the left from the trigger 1. Shutter release member 3 and shutter release trigger 1 in this example constitute a release means. As the aforesaid preparatory means, use is made of the film winding lever 10 which is constructed as disclosed in U.S. Pat. No. 3,367,251 to permit a playing movement between the retracted position for convenience during non-use in a leather case and the initial position from which an effective film winding and shutter cocking operation starts. With the film winding lever 10 set in the initial position, the actuating mechanism is rendered operative as the setting means 11 is made rotatable in the counterclockwise direction from the illustrated position until the upper pin comes to abut against the stopper pin 10a. When the film winding lever 10 is moved from the initial position to the retracted position, the motion of the lever 10 is transmitted through the pin 10a-and-pin 11a connection and the pin 13-and-lever end 7a connection to the switching means 7.

When a daylight exposure is to be made with manually selected shutter speed and diaphragm aperture values, the operator will turn a shutter dial to select the desired shutter speed value and then a diaphragm ring to place a symbol "AE" (Automatic Exposure) out of registry with a index (not shown) until the desired diaphragm aperture value is in registry with the index. In this manner, a bar 19 is caused to enter the path of movement of the slidable plate 5 at a point adjacent the right end thereof, as the slidable plate 5 is previously set in that position under the action of spring 20 through a diaphragm closing down lever 41-and-hook 5c connection. When the shutter release button is depressed, the trigger slide 1 along with the shutter release member 3 which is urged by a compressed spring 6 for abutment against an extension 1d from another extension 1c are moved downwardly to strike the shutter lever 4 by the downwardly extending lug 3a, as the projection 3b is permitted to pass through the first lateral recess 5a. In this case, the scanning member 21 remains in the inoperative position.

When a daylight exposure is to be made in the automatic mode, the operator may turn the diaphragm ring to place symbol "AE" in registry with the index, thereby the bar 19 is retracted from the path of movement of plate 5. Assuming now that the deflected point 28 is in alignment with the recess 23a of clamping plate 23, indicating that the light value as sensed by the photosensitive element Pc is higher beyond the automatically operating daylight exposure diaphragm aperture range, when the shutter button is depressed to an intermediate point in the normal stroke length, the clamping plate 23 enters at its left side forward corner 23c into the path of movement of an extension 1c' to hinder further movement of the trigger slide 1, so that the shutter release is not actuated.

Assuming alternatively that the light value falls within the automatically operating exposure range, when the shutter button is depressed to the full stroke the arm 1e of the release lever 1 rotates the link lever 30 about the fixed pin 34 and the plate 5 is moved in the direction of the arrow by means of the levers 31 and 32 connected by the spring 33 to the link lever 30, the clamping plate 23 is moved in following relation to plate 5 under the action of spring 26 until it presses the pointer 28 against the stationary abutment 24, and, after a certain further movement of plate 5, the scanning member 21 is impelled against the pointer 28, as the seesaw lever 22 is pivoted about the film speed setting lever pin 29a against the force of spring 40 to move the central pivot pin 25 in a linear direction. Thus, the final position of the scanning member 21 depends upon the position of the deflected pointer. The scanning result is introduced through the seesaw lever 22, the slidable plate 5 and the diaphragm closing down lever 41 to a diaphragm mechanism of the camera, thereby the automatic formation of the daylight exposure diaphragm aperture is effected. Subsequent thereto, the release trigger 1 continues to push the lever 30 by means of the arm 1e and descends while rotating the lever 30 about the fixed pin 34 against the spring 33, the shutter lever 4 is struck by the lug 3a as the projection 3b is permitted to pass through the second lateral recess 5b.

In the case of a lower light value beyond the automatically operating daylight exposure range, as the deflected pointer 28 assumes the right terminal position designated with L, a relatively short depression of the shutter release button is sufficient to effect engagement of the scanning member 21 against the pointer 28. In addition, the slidable plate 5 is moved to place its extension 5f or blocking means in alignment with the projection 3b, so that a further depression of the shutter release button gives the operator's finger a rapidly increased heavy impression since the force of further compressed spring 6 is added to the sum of those of springs 2 and 33. Thus, the operator is informed of the fact that flash lighting is necessary for a given photographic situation. If he intends to make a flash exposure, the shutter button will be further depressed in excess of the normal stroke length, thereby the first switch blocking means or slide 9 is moved downwardly against the force of spring 9' in engagement at its tail extension 9b with the arm 1a of the shutter release trigger 1, and then a changeover switch control lever 42 is actuated by the lower side of the slide 9 to select a shutter speed of, for example, 1/60 second, particularly adapted for use in flash photography. As the slide 9 is moved downwardly, upon disengagement of the extension 9a from the actuating lever head 7c where the winding lever 10 is in the aforementioned initial position, the switching means 7 is turned clockwise about pivot pin 8 under the action of spring 7' which is stronger than that of spring 11' of the second detent means to close the switches 14 and 38, namely, the flash energy supply control switch $S_1$ and flash mode selector switch $S_2$ of FIG. 1. Next, he has to remove his finger from the shutter button. From this time onward, the first switch blocking means (slide 9) is latched in the advanced position under the lower side of the lever head 7c. In a short time interval during which the storage capacitor $C_1$ is charged to a satisfactory operating voltage level for the flash lamp FL at which level the neon discharge tube $L_1$ starts to light on, and the flash exposure computer responsive to the outputs of the control circuit FC and the output of the camera-to-object distance setting variable resistor VR produces an output depending upon the actual voltage stored on the storage capacitor $C_1$ and which is then applied to the exposure meter M or 27.

The meter point 28 swings to a position corresponding to the distance to the object and the charge voltage of the capacitor. When the operator pushes down the shutter button, the diaphragm is automatically determined corresponding to the position of the pointer in a similar way as in the AE photography, and then the projection 3b of the shutter release member 3 pushes the shutter lever 4 to release the shutter, and the known X contact point is closed and the trigger circuit TR is actuated to illuminate the flash.

After the photographic operation has been ended, the operator may move the film winding lever 10 from the initial position to the retracted position through an angular distance during which the stopper pin 10a abuttingly engaging with the pin 11a moves the setting means 11 in the clockwise direction with simultaneous counter-clockwise movement of the switching means 7 in engagement with the second switch blocking means 11b against the force of spring 7'. At or near the termination of movement of switching means 7, the slide 9 is returned upwardly to the illustrated position under the action of spring 9', and the switches 14 and 38 are opened. In this state, even if the actuating mechanism is moved with the slide 9 struck by the arm 1a as the shutter button is accidentally depressed, the closure of the flash energy supply control switch does not occur because of the latching of the switching means 7 by the setting means 11.

It will be appreciated from the above description that the objects and purposes of the invention for simplifying automatic switching of the camera from the daylight of the flash mode with assurance of firing of the speedlight type flash lamp and for minimizing degradation of the flash energy sourcing battery which would be otherwise effected by the preparatory closure of the supply control switch therefor or by overlooking the necessary manipulation of opening the switch before the camera is left aside during non-use.

While the present invention has been described above in detail with reference to one preferred embodiment thereof, changes therefrom can be resorted without departing from the spirit of the invention. For example, instead of using two successive actuations of the shutter button when a lower light value beyond the automatically operating daylight exposure range to thereby effect automatic selection of the flash mode, it is possible to use a single actuation of the shutter button in making an exposure with automatic selection of the flash mode. In this case, as soon as the follower plate of the shutter release trigger is rockered, the actuating mechanism of the invention is caused to start for closure of the switches. A further depression of the shutter button results in actuation of the shutter release and initiation of firing of the flash lamp. This construction is particularly advantageous in use in connection with an electronic flash device of shorter recycle time. Further, the automatic formation of the exposure value is not limited to the diaphragm aperture. The present invention may be applied to cameras having automatic control of the shutter.

What is claimed is:

1. In a camera having flash lighting means and automatic exposure control means including a light measuring element, an electrical power source switch device for flash comprising:

switching means for opening and closing the electrical power source switch for flash;

release means including a shutter release member;

first switch blocking means cooperative with said release means for latching said switching means in the inoperative position; and release blocking means cooperative with said automatic exposure control means for blocking said shutter release member in the inoperative position, whereby when the shutter release member is blocked by the release blocking means, said release means acts on said first switch blocking means to release blocking of the switching means so that power supply to the flash lighting means is effected.

2. In the device of claim 1, there is further provided second switch blocking means cooperative with said switching means, and setting means by which said seond switch blocking means is set to a blocking or unblocking position of the switching means, whereby said switching means closes the power switch for flash only when said second switch blocking means is set to the unblocking position and the first switch blocking means is moved by the release means.

3. In claim 2, said setting means is operated by a film winding lever of the camera.

* * * * *